United States Patent [19]

Andrews et al.

[11] Patent Number: 4,997,994
[45] Date of Patent: Mar. 5, 1991

[54] ARTICLE HAVING MARKING THEREON AND METHODS OF MAKING

[75] Inventors: Jack E. Andrews, Stone Mountain; Celestino Rey, Atlanta; Robert A. Wessels, Jr., Chamblee, all of Ga.

[73] Assignee: AT&T Bell Laboratories, Murray Hill, N.J.

[21] Appl. No.: 402,208

[22] Filed: Sep. 1, 1989

[51] Int. Cl.$^5$ .................. H01B 7/36; B23K 26/00
[52] U.S. Cl. ..................... 174/112; 219/121.68; 219/121.69
[58] Field of Search ............... 174/112; 118/DIG. 21, 118/DIG. 22; 101/93.05; 219/121.68, 212.69

[56] References Cited

U.S. PATENT DOCUMENTS

| | | | |
|---|---|---|---|
| 1,607,432 | 11/1926 | Bryce | 174/112 |
| 2,739,528 | 3/1956 | Lowe | 101/37 |
| 2,745,436 | 5/1956 | Battle et al. | 174/112 |
| 2,867,001 | 1/1959 | Lewis et al. | 174/112 |
| 3,076,235 | 2/1963 | Rollins et al. | 174/112 |
| 3,193,614 | 7/1965 | Richards | 174/112 |
| 3,229,623 | 1/1966 | Rubinstein et al. | 174/112 |
| 3,434,456 | 3/1969 | Geating | 118/211 |
| 3,551,542 | 12/1970 | Perrone | 264/166 |
| 3,552,308 | 1/1971 | Minehart | 101/37 |
| 3,711,757 | 1/1973 | Reforzo | 318/600 |
| 3,788,213 | 1/1974 | Brown et al. | 101/37 |
| 4,028,523 | 6/1977 | Anderl et al. | 219/121.69 X |
| 4,085,357 | 4/1978 | Ansberg et al. | 318/590 |
| 4,182,239 | 1/1980 | Timmins et al. | 101/11 |
| 4,370,542 | 1/1983 | Mills et al. | 219/121.68 |
| 4,579,759 | 4/1986 | Breuers | 428/343 |
| 4,652,722 | 3/1987 | Stone et al. | 219/121.76 |
| 4,720,618 | 1/1988 | Stamer et al. | 219/121.61 |
| 4,727,235 | 2/1988 | Stamer et al. | 219/121.68 |
| 4,808,966 | 2/1989 | Ferlier et al. | 338/214 |
| 4,826,278 | 5/1989 | Gartside, II et al. | 350/96.23 |

FOREIGN PATENT DOCUMENTS

| | | |
|---|---|---|
| 1465840 | 3/1969 | Fed. Rep. of Germany . |
| 2260109 | 6/1973 | Fed. Rep. of Germany ...... 174/112 |
| 2611696 | 9/1977 | Fed. Rep. of Germany ...... 174/112 |
| 3147230 | 6/1983 | Fed. Rep. of Germany . |

Primary Examiner—Morris H. Nimmo
Attorney, Agent, or Firm—E. W. Somers

[57] ABSTRACT

An elongated material such as a cable (20), for example, is provided with a repetitive pattern of a marking (40) which provide information to an observer. Each marking includes intentionally discernible indentations or recesses (33—33) which are formed in plastic material comprising an outer covering (32) of the elongated material. Further, each indentation is filled with a pigmented material (50) which provides a desirable color contrast with the color of the outer covering. The filling material must have a melt viscosity which allows it to be flowed easily into the indentations, yet be retainable in the indentations during handling of the elongated material such as during installation of a cable.

6 Claims, 1 Drawing Sheet

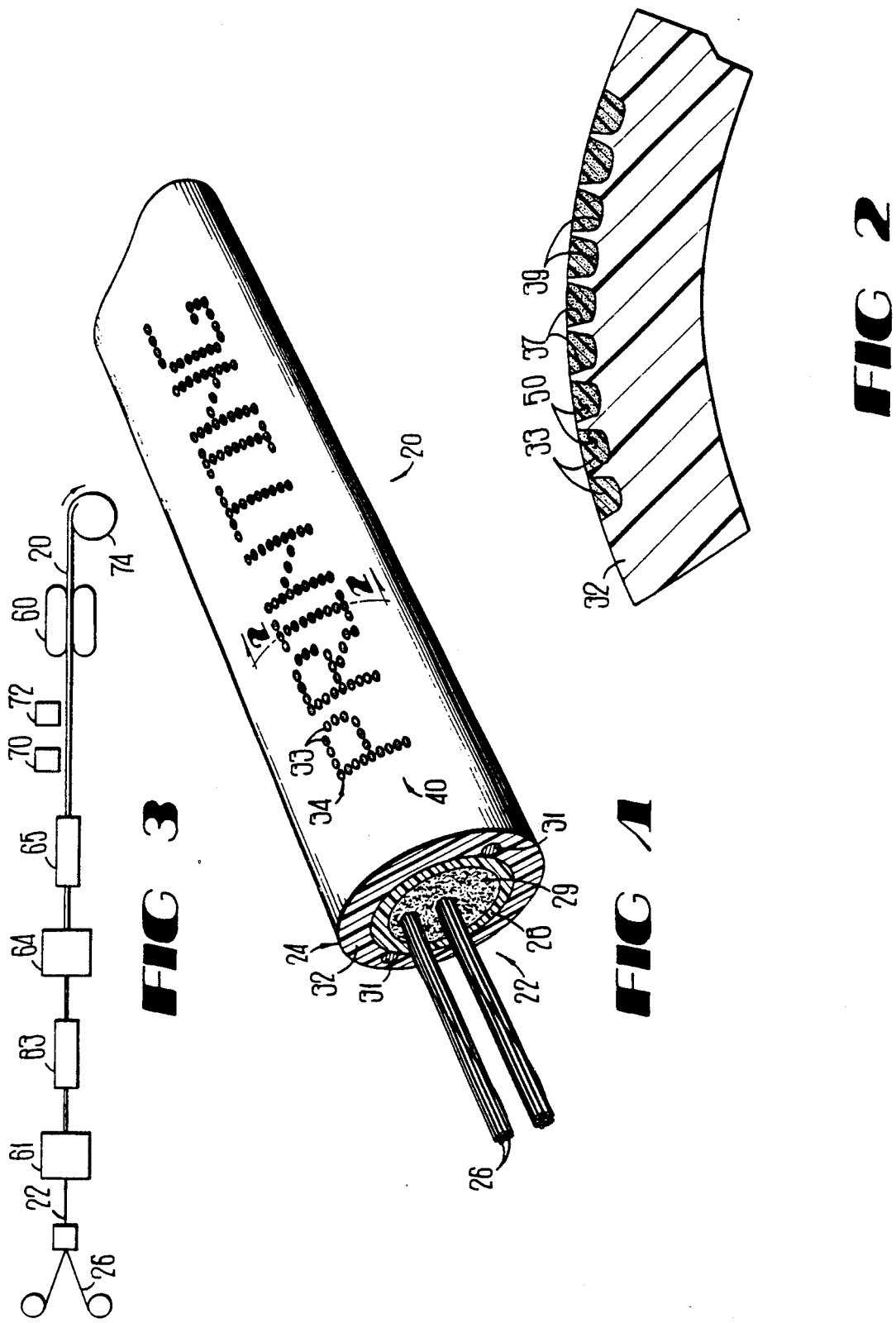

ARTICLE HAVING MARKING THEREON AND METHODS OF MAKING

TECHNICAL FIELD

This invention relates to an article having a marking thereon. More particularly, the invention relates to a cable having indentations formed in an outer surface of an outer plastic jacket thereof with the indentations being filled with a material which contrasts in color with that of the plastic jacket.

BACKGROUND OF THE INVENTION

Cable is a widely used transmission medium in the communications industry. Typically, a communications cable includes a core comprising a transmission medium and a sheath system. The transmission medium may be an insulated metallic conductor or an optical fiber. The sheath system generally includes a plastic jacket. A commonly used plastic material for the jacket in outside plant communications cables is polyethylene.

For reasons which should be apparent, cables are marked. For example, the markings may be used to provide information such as the name of the manufacturer, type of cable and footage length. Of course, these markings should be permanent and not be removeable by normal contact with expected objects or by handling or by exposure to the elements.

Inks have been used for some time to mark cable jackets. The ink may be applied by a contact wheel printer. A currently used cable ink printer includes a computer controlled system that directs jet streams of ink in dot matrix, alpha-numeric codes onto the outer plastic cable jacket. The length accuracy of the markings can be adjusted to ±0.1% by changing electronically an input signal from a counter wheel. From a manufacturing point of view, this system appears to be a significant improvement over a previously used contact ink marker.

Marking with inks on polyethylene has always been a problem for the industry because of the wax-like surface of polyethylene and the lack of polar groups in its molecular structure which would facilitate adhesion thereto of a marking material. Unfortunately it has been found that ink jet marks are removed easily during routine cable handling. This, of course, leads to customer complaints and may result in lost business for a cable manufacturer. Long sought after has been a cost-effective, indented, permanent marking for cable jackets.

Currently, processes other than those which involve the application of ink to a cable jacket are in use in copper and in optical fiber cable manufacture, but even these suffer some disadvantages. For example, in order to mark permanently cable jackets, hot stamp apparatus has been used. Such apparatus is mechanically driven and produces high quality marks, but it is relatively expensive to operate. The capital costa and the running costs due to foil consumption cause the system to be significantly more expensive to operate than other systems. Because the unit is not computer-controlled, cable codes must be changed using print type. This is a time-consuming process. Another disadvantage of the hot stamp marker is the difficulty of establishing a correct footage measurement of a desired accuracy. Also, the marking of cable jackets with embossed letters is known in the art.

In another approach, numerical and/or alphabetical recesses or indentations have been formed by lasers in plastic material comprising cable jackets. One example of a cable marking method and apparatus using lasers is disclosed in U.S. Pat. No. 4,370,542 which issued on Jan. 25, 1983.

It has been recognized that laser units hold promise as future marking systems. The laser has no consumables and is very reliable because of an all electronic construction. Inasmuch as there are no mechanical wear points, maintenance requirements for a laser cable marking system are negligible. Loading cable product codes may be accomplished by using a keyboard, or to reduce human error, by using a bar code reader. In one laser marking system, as many as seventy-five characters can be stored in the laser's buffer memory. As the laser is activated by a line counter, a five by seven dot matrix marking is burned into the cable jacket. The marking is synchronized to the manufacturing line speed through an optical encoder.

Also, markings which contrast with the color of the cable jacket are known in the prior art. For example, in U.S. Pat. No. 4,808,966 there is disclosed a cable jacket marking system which comprises two layers. A first layer includes a colorant material which is contrastingly different from the color of an overlaying second layer of plastic material. Portions of the overlaying second layer of plastic material are removed to form a desired marking which generally is repetitive along the length of the cable. The portions of the plastic material of the second layer are removed to a depth which extends to the first layer thereby exposing the first layer and providing a color contrast for the letters and/or numbers of a marking pattern in the second layer. The removal of portions of the second layer to form an alpha-numeric marking, for example, may be accomplished with a laser. Although this last-mentioned arrangement is effective to render the marking legend more discernible, it involves the use and application of another layer of plastic material.

Similarly, in the art of printed wiring boards, identifying markings are provided on a board by a process which involves the coating of a board with a material different in color from that of the board. Then, portions of the coating are burned away to have a discernible, predetermined marking remain.

What is needed and what seemingly is not provided in the art is a cable having a marking which is substantially permanent, which includes a system that does not require additional layers of material and which can be applied in existing manufacturing processes. Apparatus required for making the sought-after product should be easily intergrated into apparatus of existing manufacturing lines.

SUMMARY OF THE INVENTION

The foregoing problems of the prior art have been overcome with a marked article of this invention. An article having a marking thereon includes a substrate. The substrate has an identifying marking thereon, the marking includes indentations formed in a predetermined manner in the substrate. A filling material is disposed in the indentations and contrasts to a color of the substrate. One article of this invention, a marked cable, having an identifying marking thereon, comprises a core which includes a communications medium and a sheath system which includes at least a plastic jacket that encloses the core. The jacket has an identifying marking thereon. The marking includes recesses or indentations formed in a desired configuration to a predetermined depth in the jacket, and a curable material which fills substantially the indentations and which contrasts to a color of the material of the plastic jacket.

In a preferred embodiment, the indentations are formed in the plastic jacket by a laser. The material which is used to fill the recesses which have been formed in the plastic jacket is a wax. The filling material is characterized by a melt viscosity in a predetermined range and by pigment characteristics which provide a desired contrast with the color of the cable jacket.

In a method of providing a cable with a marking, the cable is moved along a path of travel. A laser is caused to form indentations to a predetermined depth in the cable jacket. The indentations are formed in a manner to provide a desired marking. Then a filling material which contrasts in color with that of the jacket is caused to be disposed in the indentations.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of a cable having an identifying marking provided in a jacket thereof;

FIG. 2 is a sectional view through a portion of the jacket of FIG. 1 to show a cross-sectional configuration of the marking; and FIG. 3 is a schematic view of a manufacturing line which may be used to provide a cable having a marked jacket.

DETAILED DESCRIPTION

Referring now to FIG. 1, there is shown a cable, which is designated generally by the numeral 20. The cable 20 may be a communications cable which includes a core 22 and a sheath system 24. As is known, the core 22 may include a plurality of individually insulated metallic conductors or a plurality of optical fibers 26—26 which are shown in FIG. 2. For an optical fiber cable, the optical fibers may be enclosed in a tubular member 28. A waterblocking material 29 may be disposed in the tubular member 28.

Typically, the sheath system for a metallic conductor cable may include one or more metallic shields which may be corrugated and a jacket which is made of a plastic material. For an optical fiber cable such as the one depicted in FIG. 1, the core 22 and tubular member 28 are enclosed in a jacket 32 of plastic material. Embedded in the jacket 32 may be a plurality of strength members 31—31. See U.S. Pat. No. 4,826,278 which issued on May 2, 1989 in the names of C. H. Gartside, III, A. J. Panuska, and P. D. Patel.

A polyethylene plastic material is used commonly for the plastic jacket 32 or for the jacket of a metallic conductor cable. The polyethylene is durable under many environmental conditions and has a relatively low dielectric constant. For the cable of the preferred embodiment, the jacket 32 comprises a high density black polyethylene material having a density of about 0.96 grams/cm$^3$.

Typically, it is desirable to provide desired information on the outer surface of the cable jacket. This may include information such as, for example, the manufacturer's name, date of manufacture, footage marks, place of manufacture and/or type of cable structure. Generally, such information is applied to the cable jacket at spaced intervals along its length.

For the cable 20 of this invention, letters and/or numerical markings are formed in the cable jacket 32 such that each letter or number comprises indentations 33—33 in the plastic material comprising the cable jacket. In the preferred embodiment, letters 34—34 and/or numerals which comprise a marking 40 on the cable jacket 32 are formed by a laser (not shown) which cuts into the jacket material.

A cable marking method and apparatus are disclosed in priorly identified U.S. Pat. No. 4,370,542, which is incorporated by reference hereinto. See also U.S. Pat. No. 4,808,966, which issued on Feb. 28, 1989 and which also is incorporated by reference hereinto. The laser (not shown) which is used must be capable of volatilizing portions of the plastic material of the jacket so as to form the indentations. In optical fiber cables such as the cable 20, the thickness of the cable jacket 32 is about 0.020 inch whereas its outer diameter is about 0.5 inch.

This indentations 33—33 which comprise the letters 34—34 and/or the numerals (not shown) are formed in a five by seven dot matrix, for example, in the jacket plastic to have a predetermined depth. The type of laser, which may be a YAG laser or a $CO_2$ laser, for example, and its operating wavelength must be such that the indentations 33—33 extend through only a portion of the thickness of the cable jacket 32. Operating parameters of the laser (not shown) and the line speed of the cable 20 during marking are controlled to control the dimensions of each of the indentations. In a preferred embodiment, the depth of each indentation 33 is in the range of about 0.003 to 0.006 inch as measured from an innermost surface of each indentation to the other surface of the jacket 32. As can be seen in FIG. 2, each indentation 33 includes sidewalls 37—37 and a crater-like bottom surface 39. A cross section of each indentation 33 as viewed outside the cable may, as one example, depending on operating parameters and line speed, be elliptical with long and short axis dimensions of about 0.015 and 0.008 inch, respectively.

Cable markings must be substantially permanent. Otherwise, the markings may be removed from the cable jacket during handling and installation. The abuse to which a cable is exposed during installation is generally the most rigorous it will encounter during its life cycle.

Needless to say, the letters and/or the numerals which are formed as indentations in the cable jacket 32 are substantially permanent. However, although they are permanent, these laser-formed letters and numerals are not very discernible to the human eye. This is especially true inasmuch as the jacket plastic generally is a black polyethylene material.

What is needed is a marking system which not only is permanent but also one which contrasts with the color of the cable jacket 32. In order to provide such a contrast to the human eye, the indentations 33—33 of the cable marking of this invention are filled with a suitable material 50. Such a material must be one which is easily pigmented in order to have the desired color contrast and further must have a suitable viscosity to facilitate application to the indentations.

The filling material 50 in a preferred embodiment fills substantially each of the indentations. As is shown in FIG. 2, which depicts the preferred embodiment, an outer surface of the filling material 50 is substantially level with an outer surface of the cable jacket.

It has been found that a commercially available wax modified in accordance with this invention is suitable for filling the indentations. A commercially available wax is modified in a preferred embodiment to have a sufficient amount of pigment constituent to provide a generally white filling for each indentation 33.

Many commercially available waxes were found to be too viscous to be flowed with ease into the indentations 33—33. Accordingly, waxes available on the marketplace must be modified to adjust the viscosity thereof. Of course, the viscosity must not be so low as to drip and thereby cause the filled marking to lack permanence. A suitable indentation filling material 50 was required to be maintained within the indentations 33—33 under environmental testing at temperatures as high as about 85° C. and during abrasion testing, simulating exposure during handling and installation. It has been found that a filling material in a preferred embodiment should have a melt viscosity at a temperature range of about 170°F. to 250° F. which is in the range of about 1000 to 5000 centipoise. A filling material having a viscosity as low as about 200 centipoise may be acceptable. What is important is that the filling material in the preferred embodiment must flow readily in a hot melt application. The viscosity of the filling material 50 may be adjusted by including a wax constituent having a suitable molecular weight.

It has been mentioned that sufficient pigment must be used to cause the filling material to exhibit a generally white color thereby providing a suitable contrast with what generally is a black polyethylene jacket. Care must be taken to strike a balance between two objectives, one of which is the requirement for a contrasting color. The other objective in the preferred embodiment is to have a filling material that flows readily in a hot melt application. Too much pigment may inhibit the flow of the filling material 50. Therefore, the composition of the filling material 50 must include a percent by weight of a pigment constituent which is sufficient to provide a desired color without inhibiting the desired flow characteristics of the filling material.

The invention has been described in terms of a cable which includes a substantially permanent marking system. It should be understood that such a marking system may be applied to substrate portions of many different articles of commerce. Also, although the filling material 50 has been described to be applied to a hot melt application, other materials which may be applied in other processes may be suitable.

In a process for providing the cable 20 with a marking, (see FIG. 3), units of optical fibers 26—26 are formed into a core 22 and moved by a capstan 60 through an extruder 61 whereat a plastic material is provided to form the tubular member 28. Then, the plastic material of the tubular member 28 is cooled in a trough 63 after which strength members 31—31 are provided about the tubular member 28. The plastic jacket 32 is extruded by an extruder 64 over the tubular member and the jacketed cable is advanced through a trough 65 whereat the jacket material is cooled.

Afterwards, a laser 70 is controlled to form indentations 33—33 in the cable jacket to a predetermined depth. The indentations 33—33 are formed in a manner to provide letters and or numerals in accordance with a desired marking. Then a filling material 50 is caused to be disposed by an apparatus 72 in each of the indentations 33—33 to a desired level therein. In a preferred embodiment, the filling material 50 extends to the outer surface of the plastic jacket 32. Then the marked cable is taken up in a takeup arrangement 74.

It is to be understood that the above-described arrangements are simply illustrative of the invention. Other arrangements may be devised by those skilled in the art which will embody the principles of the invention and fall within the spirit and scope thereof.

We claim:

1. A cable having an identifying marking thereon, said cable comprising:
   a core comprising a communications medium;
   a sheath system which includes at least a jacket which encloses said core, said jacket comprising a plastic material and having an identifying marking thereon, said marking including laser-formed indentations which have been provided in a desired manner to a predetermined depth in said jacket; and
   a curable filling material which is disposed in said indentations and which contrasts to a color of said plastic jacket material wherein said filling material comprises a composition of matter which has a melt viscosity that does not exceed a value of about 5000 centipoise and which is such that it does not inhibit the flow of said filling material into the indentations, and wherein said filling material substantially fills each of said indentations.

2. The cable of claim 1, wherein said filling material comprising a wax and having a melt viscosity which falls in the range of about 200–5000 centipoise at a temperature of about 170° F. to 250° F.

3. The cable of claim 1, wherein said filling material is a composition of matter which includes a pigment constituent which causes said filling material to have a color which exhibits a desirable contrast to the color of said jacket.

4. The cable of claim 3, wherein said cable jacket is black in color and the color of said filling material is substantially white.

5. The cable of claim 1 wherein said filling material extends from an innermost surface of said indentations to an outer surface of said plastic jacket material.

6. The cable of claim 1, wherein said cable jacket has a thickness of about 0.020 inch and the depth of each said indentation is in the range of about 0.003 to 0.006 inch.

* * * * *